US008392929B2

(12) United States Patent
Taillefer et al.

(10) Patent No.: US 8,392,929 B2
(45) Date of Patent: Mar. 5, 2013

(54) LEVERAGING MEMORY ISOLATION HARDWARE TECHNOLOGY TO EFFICIENTLY DETECT RACE CONDITIONS

(75) Inventors: Martin Taillefer, Redmond, WA (US); Gad Sheaffer, Haifa (IL)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 12/638,031

(22) Filed: Dec. 15, 2009

(65) Prior Publication Data

US 2011/0145530 A1 Jun. 16, 2011

(51) Int. Cl.
*G06F 9/455* (2006.01)
(52) U.S. Cl. ........ 718/104; 718/103; 711/170; 711/172; 711/173
(58) Field of Classification Search .......... None
See application file for complete search history.

(56) References Cited

U.S. PATENT DOCUMENTS

| | | | | |
|---|---|---|---|---|
| 5,625,835 | A * | 4/1997 | Ebcioglu et al. | 712/23 |
| 5,696,936 | A * | 12/1997 | Church et al. | 711/138 |
| 2008/0114937 | A1* | 5/2008 | Reid et al. | 711/117 |
| 2008/0115042 | A1 | 5/2008 | Akkary | |
| 2008/0256074 | A1* | 10/2008 | Lev et al. | 707/8 |
| 2009/0077329 | A1 | 3/2009 | Wood | |
| 2009/0089520 | A1 | 4/2009 | Saha | |
| 2009/0119459 | A1* | 5/2009 | Akkary et al. | 711/130 |
| 2009/0177847 | A1* | 7/2009 | Ceze et al. | 711/152 |

OTHER PUBLICATIONS

Christopher J. Rossbach—"TxLinux and MetaTM: Transactional Memory and the Operating System"—Published Sep. 2008—pp. 83-91.
Tail Moreshet—"Energy-Aware Microprocessor Synchronization: Transactional Memory vs. Locks"—Published 2006—pp. 1-7.
Ruben Titos—"Speculation-Based Conflict Resolution in Hardware Transactional Memory"—Retrieved Jun. 14, 2010—pp. 1-12.
Seth H. Pugsley—"Scalable and Reliable Communication for Hardware Transactional Memory"—Published Oct. 25-29, 2008—pp. 1-11.

* cited by examiner

*Primary Examiner* — Emerson Puente
*Assistant Examiner* — Sisley Kim
(74) *Attorney, Agent, or Firm* — Workman Nydegger

(57) ABSTRACT

One embodiment includes method acts for detecting race conditions. The method includes beginning a critical section, during which conflicting reads and writes should be detected to determine if a race condition has occurred. This is performed by executing at a thread one or more software instructions to place a software lock on data. As a result of executing one or more software instructions to place a software lock on data, several additional acts are performed. In particular, the thread places a software lock on the data locking the data for at least one of exclusive writes or reads by the thread. And, at a local cache memory local to the thread, the thread enters the thread's memory isolation mode enabling local hardware buffering of memory writes and monitoring of conflicting writes or reads to or from the cache memory to detect reads or writes by non-lock respecting agents.

33 Claims, 4 Drawing Sheets

LEVERAGING MEMORY ISOLATION HARDWARE TECHNOLOGY TO EFFICIENTLY DETECT RACE CONDITIONS

BACKGROUND

Background and Relevant Art

Computers and computing systems have affected nearly every aspect of modern living. Computers are generally involved in work, recreation, healthcare, transportation, entertainment, household management, etc.

Modern software frequently suffers from race conditions, where shared data intended to be accessed under a lock discipline is in fact accessed without respecting this lock discipline. In particular, it may be desirable to prevent multiple threads from reading or writing a particular data location when it is in use. When two or more threads simultaneously try to mutate such shared state and either or both threads do not adhere to the lock discipline, then so-called race conditions occur where particular interleavings of thread execution may lead to corruption of shared state, which in turn may lead to software failure.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method including acts for detecting race conditions. The method includes beginning a critical section, during which conflicting reads and writes should be detected to determine if a race condition has occurred. This is performed by executing at a thread one or more software instructions to place a software lock on data. As a result of executing one or more software instructions to place a software lock on data, several additional acts are performed. In particular, the thread places a software lock on the data locking the data for at least one of the exclusive writes or reads by the thread. And, at a local cache memory local to the thread, the thread enters the thread's memory isolation mode enabling local hardware buffering of memory writes and monitoring of conflicting writes or reads to or from the cache memory to detect reads or writes by non-lock respecting agents.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments may be implemented using a microprocessor design which features transactional memory facilities which enable local buffering of memory writes and monitoring of conflicting writes to the memory. Using such a design, it is possible to efficiently detect a large subset of effective race conditions using this hardware at essentially no cost to software, enabling the mechanism to be enabled in both preproduction and production environments.

Figure 1A:
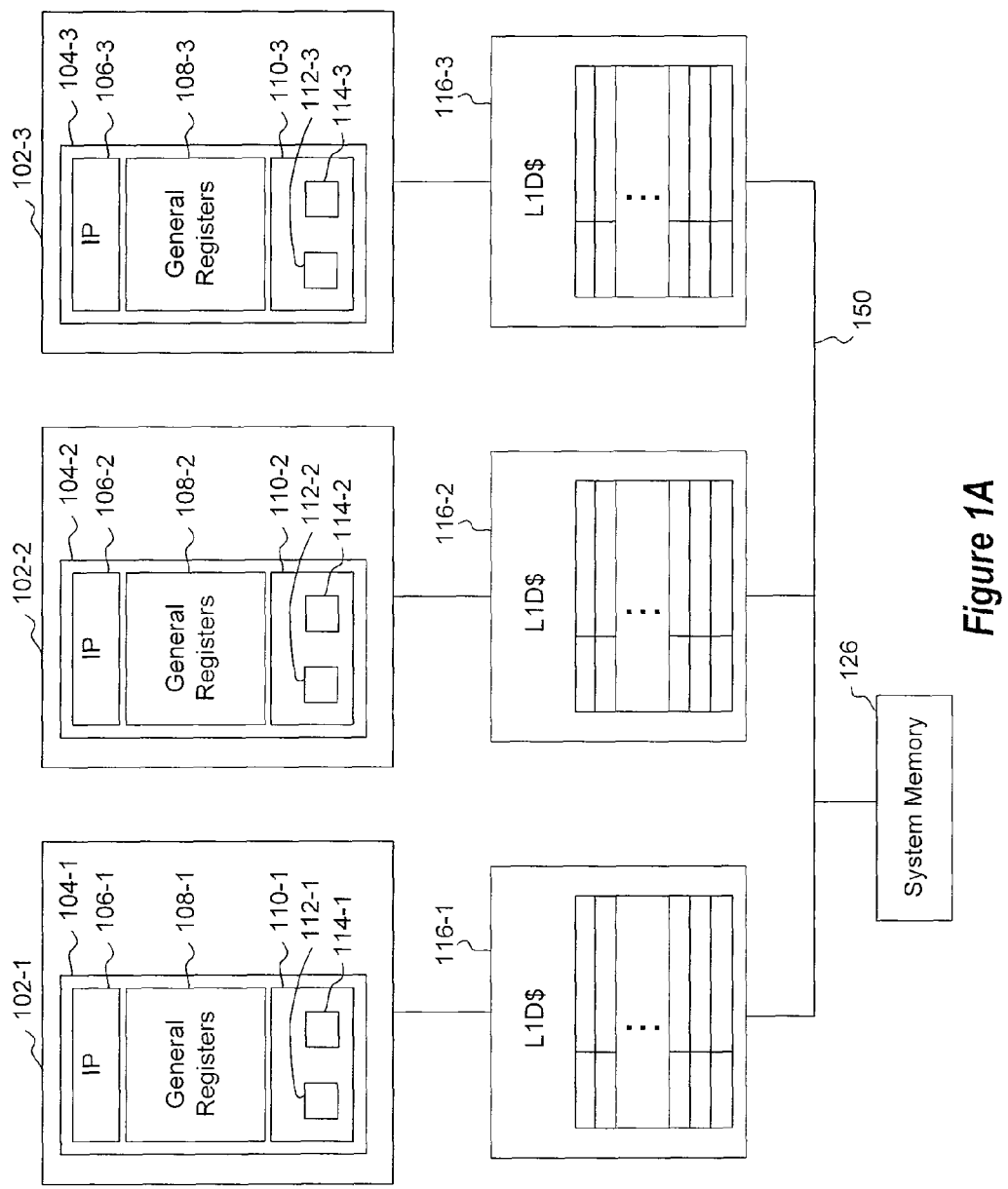
FIG. 1A illustrates a cache hierarchy.

The following discussion illustrates an example of a microprocessor design which features transactional memory facilities. Hardware transactional memory solutions may be implemented using cache memory. Referring now to FIG. 1A, an example environment is illustrated. FIG. 1A illustrates a plurality of processors 102-1-102-3. When referred to generically herein, the processors may be referred to simply as processor 102. In fact any component referred to using a specific appendix designator may be referred to generically without the appendix designator, but with a general designator to which all specific examples belong. Each of the processors implements one or more threads (referred to generically as 104). In the present example, each of the processors 102-1-102-3 supports a single thread 104-1-104-3 respectively. However, embodiments may be implemented where processors support multiple threads. Each of the threads 104-1-104-3 includes an instruction pointer 106-1-106-3, general registers 108-1-108-3, and special registers 110-1-110-3. Each of the special registers 110-1-110-3 includes a transaction control register (TCR) 114-1-114-3 and a transaction status register (TSR) 112-1-112-3. The functionality of these registers will be explained in more detail below in conjunction with the description of FIG. 1B.

Figure 1B:
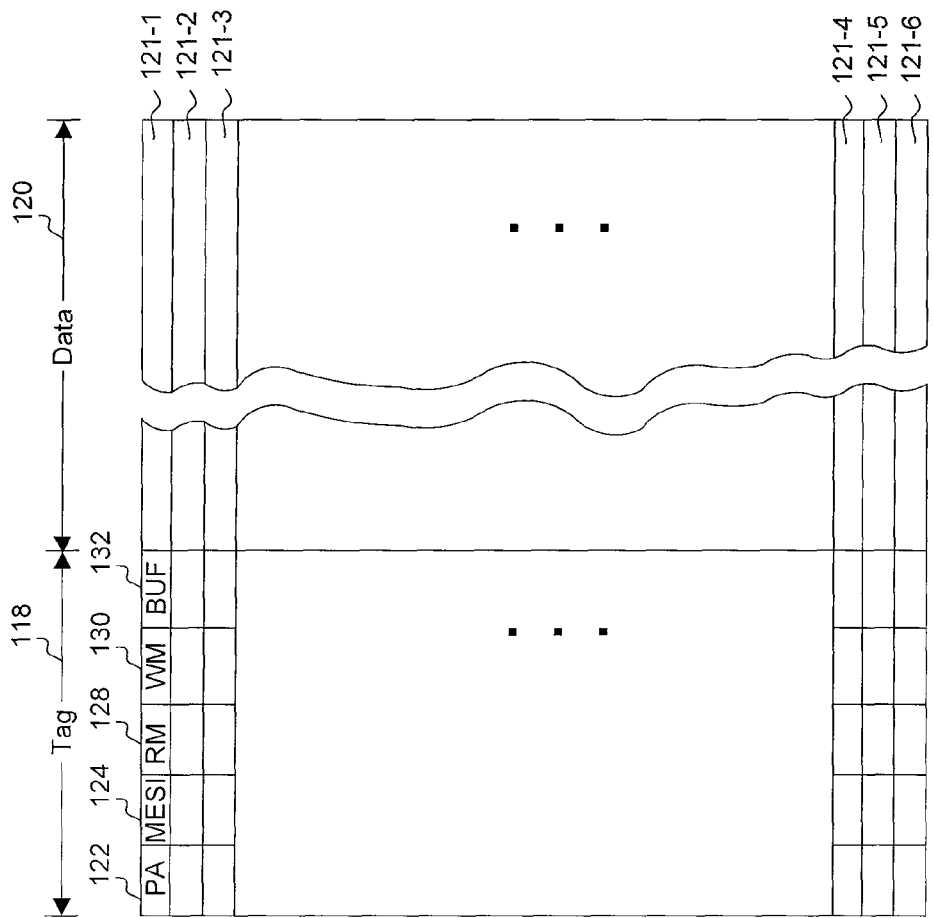
FIG. 1B illustrates details of a data cache with monitoring enabled.
Figure 1B:
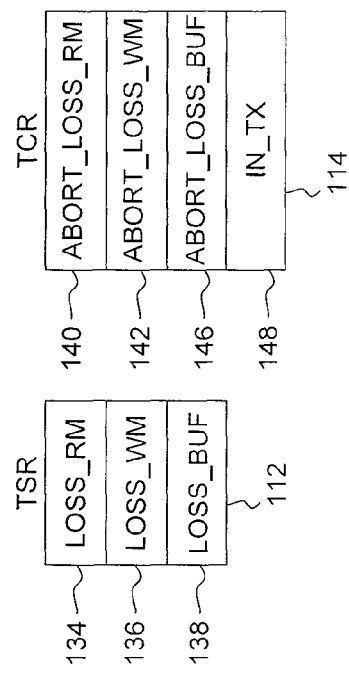

Reference once again to FIG. 1A further illustrates that connected to each processor is a level 1 data cache (L1D$) 116-1, 116-2 and 116-3. Details of a L1D$ are now illustrated with reference to FIG. 1B. FIG. 1B illustrates that a L1D$ 116 includes a tag column 118 and a data column 120. The tag column 118 typically includes an address column 122 and a MESI column 124. The MESI indicator is used for implementing the Illinois MESI protocol and indicates a state of data in a cache line. MESI stands for the modified (or dirty), exclusive, shared and invalid states respectively. Because in a cache hierarchy there may be several different copies of a particular piece of data, an indicator is used to indicate the state and sharing of data at a particular location. If the indicator indicates that the data is modified, that means that the data at that location was modified by an agent at that location and no other agents have a cached copy of the data. If the indicator indicates that data is exclusive, this means that no other agents have a cached copy of the data. If the indicator indicates that the data is shared, this means that other agents may share the same version of the data. If the data is indicated as invalid, then the data at the current location is invalid and will not be used.

In a cache-coherent multiprocessor, a level of data cache that is logically private to one processor (usually level one data cache (L1D$)) may be extended with additional MESI states and behavior to provide cache coherence based detection of conflicting data accesses from other agents, and to locally buffer speculative writes in a private cache such that other agents in the system do not observe speculatively written data until the data's state transitions from speculatively written to globally observed.

The address column 122 includes a physical address for data stored in the data column 120. In particular, as illustrated in FIG. 1A, a computing system generally includes system memory 126. The system memory may be, for example semiconductor based memory, one or more hard-drives and/or flash drives. The system memory 126 has virtual and physical addresses where data is stored. In particular, a physical address identifies some memory location in physical memory, such as system DRAM, whereas a virtual address identifies an absolute address for data. Data may be stored on a hard disk at a virtual address, but will be assigned a physical address when moved into system DRAM.

In the present example, the tag column 118 includes three additional columns, namely a read monitor column (RM) 128, a write monitor column (WM) 130 and a buffer indicator column (BUF) 132. Entries in these columns are typically binary indicators. In particular, a RM entry in the RM column 128 is set on a cache line basis for a particular thread, and indicates whether or not a block of data in the data column 120 should be monitored to determine if the data in the data column 120 is written to by another thread. A WM entry in the WM column 120 is set on a cache line basis for a particular thread, and indicates whether or not the block of data in the data column 120 should be monitored to determine if the data in the data column is read by or written to by another thread. A BUF entry in the BUF column is set on a cache line basis for a particular thread 132, and indicates whether or not data in an entry of the data column 120 is buffered data or if the data is cached data. In particular, the BUF entry can indicate whether a block of data is taken out of cache coherence or not.

Notably, while the RM column 128, the WM column 130, and BUF column 132 are treated as separate columns, it should be appreciated that these indicators could be in fact combined into a single indicator. For example, rather than using one bit for each of the columns, two bits could be used to represent certain combinations of these indicators collectively. In another example, RM column 128, the WM column 130, and BUF column 132 may be represented together with the MESI indicators in the MESI column 124. These seven binary indicators (i.e. M, E, S, I, RM, WM, and BUF) could be represented with fewer bits.

Notably, the indicators in the RM column 128, the WM column 130, and BUF column 132 may be accessible to a programmer using various programming instructions made accessible in a processor's instruction set architecture.

FIG. 1B further illustrates details of the transaction status register 112 included in the hardware threads 114. The transaction status register 112 accumulates events related to the read monitor indicator, the write-monitor indicator, and the buffer monitor indicator. In particular, the transaction status register 112 includes an entry 134 to accumulate a loss of read monitor, an entry 136 to accumulate a loss of write monitor, and an entry 138 to accumulate a loss of buffering.

Illustrating now an example, a software designer may code instructions that when executed by the thread 104-1 cause a read monitor indicator to be set for a memory block. If another thread writes to an address in the monitored memory block, such a conflicting access causes the read monitor indicator to be reset, and accumulates in the loss of read monitor entry 134. A similar case applies when a write monitor indicator is set, and another thread reads or writes to an address in the monitored memory block, causing the write monitor to be reset, and accumulates in the loss of write monitor entry 136.

FIG. 1B illustrates further details of the transaction control register 114. The transaction control register 114 includes entries defining actions that should occur on the loss of read monitor, write-monitor, and/or buffering. In particular, the transaction control register 114 includes an entry 140 that indicates whether or not a transaction should be aborted on the loss of the read monitor, an entry 142 that indicates whether or not a transaction should be aborted on the loss of the write monitor, and an entry 146 that indicates if the transaction should be aborted on the loss of buffering. Abort is implemented by a hardware control transfer (jump) to a software abort handler.

For example, and continuing with the example above where a software designer has coded instructions that when executed by the thread 104-1 cause a read monitor indicator to be set for a memory block, if another thread writes to an address in the memory block, in addition to noting such access in the read monitor entry 134, the read monitor indicator in the read monitor column 128 may be reset.

The following illustrates using a microprocessor design which features transactional memory facilities which enable local buffering of memory writes and monitoring of conflicting writes to the memory. When software acquires a software lock, it enables the processor's memory isolation hardware. For example, an in transaction indicator may be set such that the RM entry in the RM column 128 may be set, the WM entry in the WM column 130 may be set, as well as the BUF entry in the BUF column 132 for a cache line when data is written to the cache line. From this point, memory writes are buffered internal to the processor, and memory reads are monitored such as to detect if another processor reads or writes to the memory location. This can be detected using the TSR 112 as indicated by LOSS_RM 134, LOSS_WM 136, or LOSS_BUF 138.

When software releases a software lock, it exits the processor's memory isolation mode, such as for example by clearing the in-transaction indicator. Exiting the processor's memory isolation mode causes all buffered memory writes to become globally visible and all read and write monitoring to be dismissed.

While in memory isolation mode, if the processor 102 runs out of resources to hold isolated state, such as by running out of cache memory, the processor 102 automatically selects some of the isolated state which it commits to main system memory 126, thus breaking the isolation "bubble" around the state. In particular, a portion of cache memory whose state has been committed to main memory is no longer isolated with respect to new reads and writes until such isolation is re-established on the new reads and/or writes. This is not reported to software as any kind of failure. Thus, as will be explained in more detail below, a window of operations can be protected from race conditions, where the window is typically moved along a critical section of operations in increments the size of a cache line.

Figure 2:
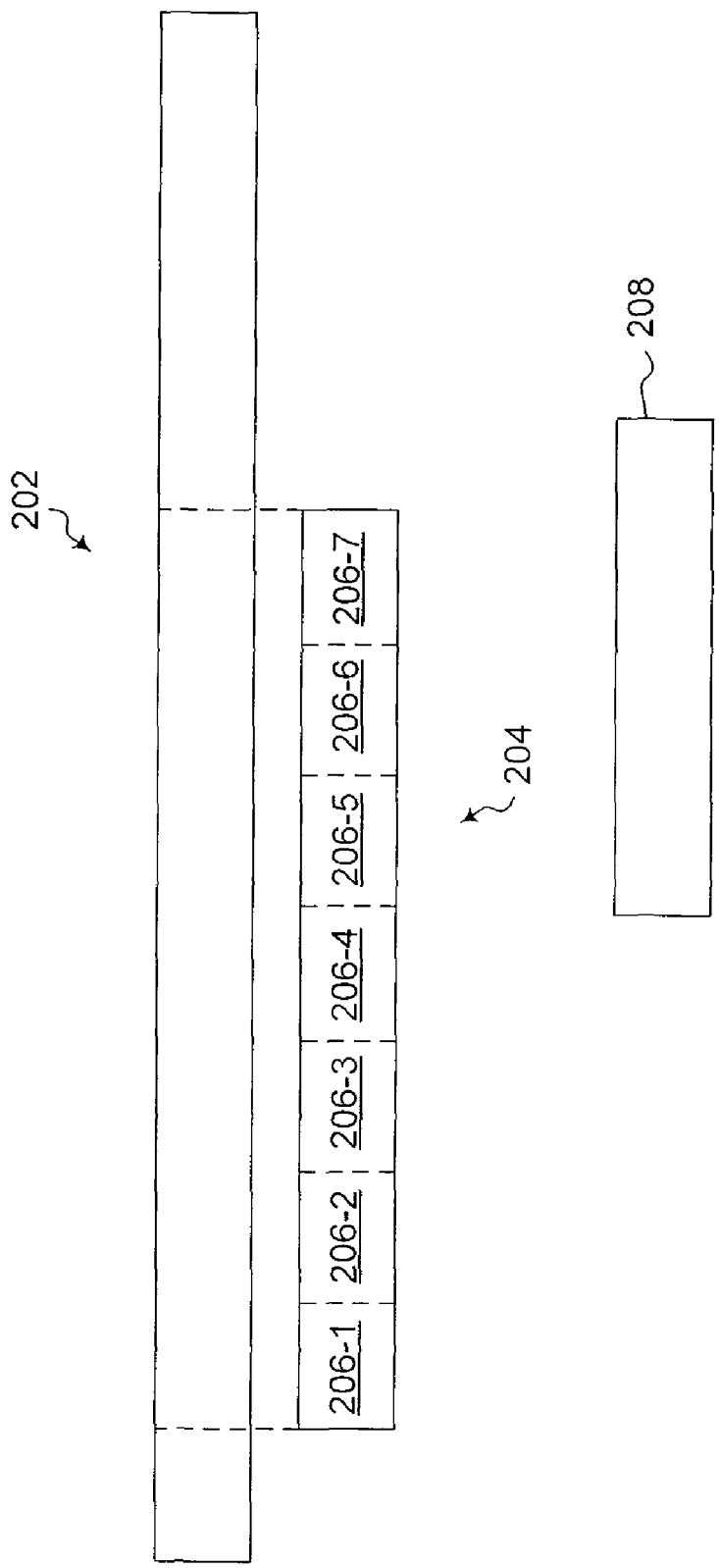
FIG. 2 illustrates a race detection window.

Illustrating now an example, reference is directed to FIG. 2. FIG. 2 illustrates a critical section 202. The critical section 202 is a set of accesses that are protected by a software lock. The semantics of a lock are such that only one processor at a time is allowed to read and write from a set of memory locations. Locks are by convention, and it is readily possible for the memory locations protected by the lock to be accessed without first acquiring the lock. Acquiring the software lock causes memory isolation hardware to be invoked, such as creating a window 204 of cache memory that buffers reads and writes. The window is composed of a number of cache lines 206-1-206-7. The number of cache lines illustrated here is only for illustrative purposes, and other alternative embodiments may be implemented. As illustrated, the window 204 includes less data space than the amount of data from the critical section 202. The window is filled in a ring buffer fashion whereby a first cache line 206-1 is filled, after which a second cache line 206-2 is filled, and so forth until cache line 206-7 is filled. If the window 204 becomes completely filled, then data can be committed from a cache line (e.g. the first cache line 206-1) to main memory 208 and the first cache line can be used again to store state data. When the first cache line 206-1 is filled again, the second cache line 206-2 can be committed to main memory 208, and reused. Processing continues thusly until the end of the critical section 202 after which all state from the window 204 is committed, or until a race condition occurs.

Race detection occurs when one processor accesses state which is currently being buffered or monitored by another processor. When this happens, it indicates that the state being accessed under lock by one processor is also being accessed without a lock by another processor, which is a tell-tale sign of a realized race condition. With reference to FIGS. 1A and 1B, race detection can occur when LOSS_RM 134, LOSS_WM 136, or LOSS_BUFF 138 is set in the TSR 112.

When the hardware detects a race condition, it uses a signaling mechanism to notify software of the error. This can take any one or more of many different forms including raising exceptions, branching to a specific memory address, setting a status bit, etc.

The race detection mechanism described herein can be extremely cheap to implement at the hardware level, given existing transactional memory hardware or similar isolation hardware. It can track race conditions at an extremely low cost to software, making it a viable solution to leave enabled in production code. This makes it possible to dynamically detect and report software failures which currently go undetected and lead to subtle data corruption errors.

Embodiments may be characterized as a fail-fast approach to race conditions, where problems are detected and the offending component is quickly shutdown before it has a chance to introduce corruption and failure in the rest of the system.

Thus, embodiments may include features enabling race detection logic in a shipping software product, be it an operating system or an application, to discover realized race conditions and allow software to react and compensate for the race condition in a variety of ways. Leveraging memory isolation hardware can be used to provide opportunistic race detection at virtually no cost to software. Embodiments include a physical mechanism in the microprocessor to allow the processor to selectively and autonomously "spill" isolated state to main memory without notifying software or aborting or dooming the memory isolated state of the hardware.

Isolation hardware is normally designed to be an all-or-nothing mechanism. If the processor runs out of isolation resources, it normally terminates the isolation context with an error reported to software. The notion of allowing state to exit the isolation bubble based on processor resource utilization is a useful and unique feature.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. Further, it should be understood that the methods may be practiced by a computer system including one or more processors and computer readable media such as computer memory. In particular, the computer memory may store computer executable instructions that when executed by one or more processors cause various functions to be performed, such as the acts recited in the embodiments.

Figure 3:
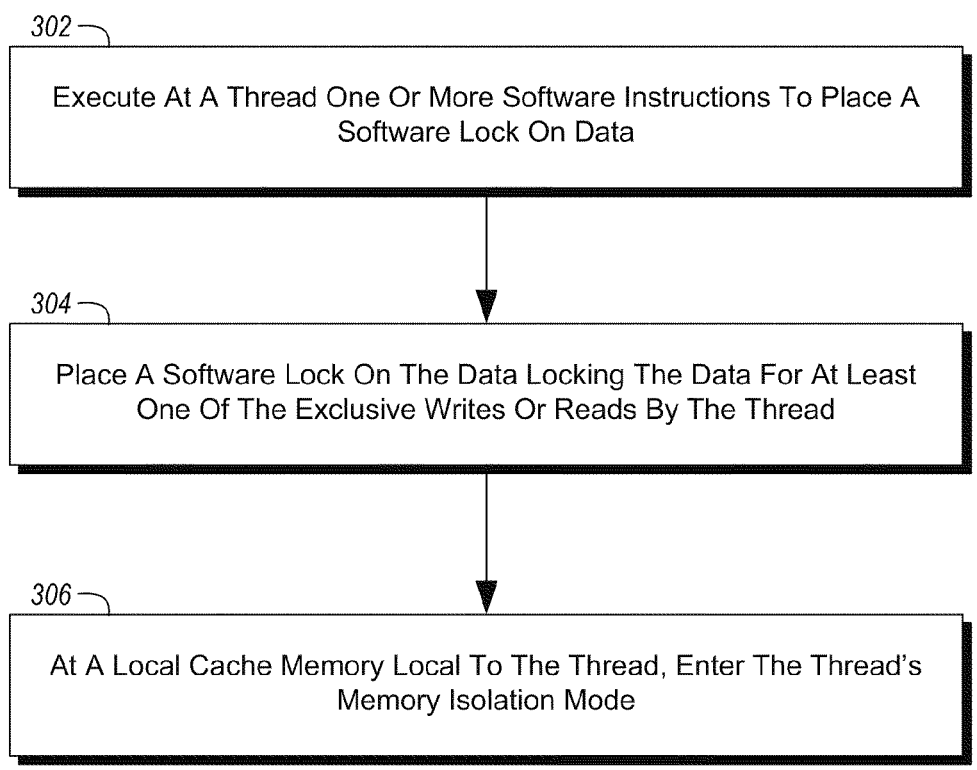
FIG. 3 illustrates a method of enabling race detection.

FIG. 3 illustrates a method 300 that may be practiced in a computing environment. The method 300 includes acts for detecting race conditions. The method 300 includes beginning a critical section, during which conflicting reads and writes should be detected to determine if a race condition has occurred. This is performed by executing at a thread one or more software instructions to place a software lock on data (act 302). As a result of executing one or more software instructions to place a software lock on data, several additional acts are performed. In particular, the thread places a software lock on the data locking the data for at least one of exclusive writes or reads by the thread (act 304). And, at a local cache memory local to the thread, the thread enters the thread's memory isolation mode enabling local hardware buffering of memory writes and monitoring of conflicting writes or reads to or from the cache memory to detect reads or writes by non-lock respecting agents (act 306).

The method 300 may further include determining that the local cache memory is out of resources to hold isolated state and as a result, automatically selecting at least a portion of isolated state from the cache memory and committing data in it to main system memory of a system, thus freeing up cache memory for later loads or stores, without dooming or aborting the thread's memory isolation mode due to committing the data. For example, as illustrated in FIG. 2, a cache line 206 can be committed to main memory 208 without dooming the hardware isolation for the whole window 204.

The method 300 may be practiced where enabling local hardware buffering of memory writes and monitoring conflicting reads or writes to the cache memory includes setting an indicator in the processor indicating that the processor is in a hardware transaction.

The method 300 may further include, detecting an access of the data by a non-lock respecting agent, by detecting a violation of at least one of the local hardware buffering of memory writes or monitoring conflicting reads or writes to the cache memory. For example, in the examples illustrated in FIGS. 1A and 1B, illegal reads or writes may be detected and annotated in the TSR 112. As a result of detecting an access of the data by a non-lock respecting agent, by detecting a violation of at least one of the local hardware buffering of memory writes or monitoring conflicting reads or writes to the cache memory, embodiments of the method 300 may include notifying software of a race condition. This may be done, for example, by at least one of raising an exception, branching to a specific memory address; or setting a status bit.

The method 300 may further include, for example if no race conditions are detected, executing at the processor one or more software instructions to release the software lock on the data. As a result of executing one or more software instructions to release the software lock on the data, at a local cache memory local to the processor, the method 300 may include exiting the processor's memory isolation mode causing all buffered memory writes to become globally visible and all read and write monitoring to be dismissed.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system having a plurality of microprocessors each with the ability to access shared data from a system memory, a computer-implemented method that controls a microprocessor design for a transactional memory system that enables local buffering of write transactions at a first microprocessor while also monitoring conflicting write transactions at other microprocessors, in order to detect race conditions when threads processing on the first and one or more other microprocessors attempt to write conflicting states for shared data from system memory, the computer-implemented method comprising:

at a first microprocessor initiating isolation hardware triggered by software running at the first microprocessor that acquires a software lock so that thereafter memory writes are buffered internal to the first microprocessor, and memory reads are monitored to detect if another microprocessor reads or writes to the memory location being monitored;

establishing a level one data cache at the first microprocessor, the level one data cache comprising;

a data column for caching data retrieved and operated upon by a thread executing at the first microprocessor; and a tag column which has a first portion for storing a physical address for the data retrieved and operated upon by the thread executing at the first microprocessor, and a second portion for storing at least the following indicators relating to the data retrieved and operated upon by the thread executing at the first microprocessor:

(i) a read monitor (RM) indicator that determines if the data retrieved and operated upon by the thread executing at the first microprocessor is written to by another thread executing at another microprocessor;

(ii) a write monitor (WM) indicator that determines if the data retrieved and operated upon by the thread executing at the first microprocessor is read by or written to by another thread executing at another microprocessor; and (iii) a buffer (BUF) indicator that indicates whether the data retrieved from the level one data cache and operated upon by the thread executing at the first microprocessor is taken out of cache coherence;

at a transactional status (TS) register of a thread executing at the first microprocessor, accumulating events based on the status of the RM, WM and BUF indicators stored in said second portion of the tag column so that loss of RM, loss of WM and/or loss of BUF will be indicated in the transactional status register if such occurs; and at a transactional condition (TC) register of the thread executing at the first microprocessor, accumulating events that define abort actions that are to occur in the event of the loss of RM, WM and/or BUF status for the data retrieved and operated upon by said thread executing at the first microprocessor, where any abort action will implement a hardware control transfer to a software abort handler; and determining, while isolated by the isolation hardware, that the level one data cache is out of resources and as a result, automatically selecting at least a portion of the data from the level one data cache and committing the selected portion of data to main system memory, thus freeing up the level one data cache without dooming or aborting memory isolation mode of the thread running at the first microprocessor, the portion of selected data committed to main memory no longer being isolated with respect to new reads and writes until such isolation is re-established.

2. The computer-implemented method of claim 1, wherein triggering the isolation hardware at the first microprocessor comprises setting an indicator indicating that the first microprocessor is in a hardware transaction.

3. The computer-implemented method of claim 1, further comprising, detecting an access of the data at the level one data cache of the first microprocessor after the isolation hardware at the first microprocessor has been triggered, by a non-lock respecting microprocessor, by detecting a violation of at least one of local hardware buffering of memory writes or monitoring conflicting read or writes to the level one data cache of the first microprocessor as indicated by loss of at least one of the RM, WN or BUF indicators.

4. The computer-implemented method of claim 3, wherein, as a result of detecting an access of the data in the level one data cache of the first microprocessor by a non-lock respecting microprocessor the software abort handler sends a software notification of a race condition.

5. The computer-implemented method of claim 4, wherein the software notification comprises raising an exception.

6. The computer-implemented method of claim 4, wherein the software notification comprises branching to a specific memory address.

7. The computer-implemented method of claim 4, wherein the software notification comprises setting a status bit.

8. The computer-implemented method of claim 1, further comprising: executing at the first microprocessor one or more software instructions to release the software lock; and as a result of executing one or more software instructions to release the software lock, causing all buffered memory writes in the level one data cache of the first microprocessor to become globally visible and all read monitoring in the level one data cache of the first microprocessor to be dismissed.

9. The computer-implemented method of claim 1 wherein the RM, WM and BUF indicators are each stored in separate columns within said second portion of the tag column.

10. The computer-implemented method of claim 1 wherein the RM, WM and BUF indicators are combined into a single indicator represented in a binary form and stored in a single column of the second portion.

11. The computer-implemented method of claim 1 wherein the level one data cache further comprises an indicator (MESI) that indicates one of the following states for data cached at the first microprocessor: (i) modified, meaning that the data was modified by another microprocessor and no other microprocessors have a cached copy of the data, (ii) exclusive, meaning that no other microprocessor has a cached copy of the data, (iii) shared, meaning that other microprocessors may share the same version of the data, and (iv) invalid, meaning that the data is invalid and will not be used.

12. The computer-implemented method of claim 11 wherein the MESI indicator is stored in a separate column within said first portion of the tag column.

13. The computer-implemented method of claim 11 wherein the RM, WM, BUF and MESI indicators are combined into a single indicator represented in a binary form and stored in a single column of the second portion.

14. In a computing system having a plurality of microprocessors each with the ability to access shared data from a system memory, a computer program product comprising physical storage media having computer-executable instructions for implementing a computer-implemented method that controls a microprocessor design for a transactional memory system that enables local buffering of write transactions at a first microprocessor while also monitoring conflicting write transactions at other microprocessors, in order to detect race conditions when threads processing on the first and one or more other microprocessors attempt to write conflicting states for shared data from system memory, and wherein the computer-implemented method comprises:

at a first microprocessor initiating isolation hardware triggered by software running at the first microprocessor that acquires a software lock so that thereafter memory writes are buffered internal to the first microprocessor, and memory reads are monitored to detect if another microprocessor reads or writes to the memory location being monitored; establishing a level one data cache at the first microprocessor, the level one data cache comprising;

a data column for caching data retrieved and operated upon by a thread executing at the first microprocessor; and a tag column which has a first portion for storing a physical address for the data retrieved and operated upon by the thread executing at the first microprocessor, and a second portion for storing at least the following indicators relating to the data retrieved and operated upon by the thread executing at the first microprocessor:

(i) a read monitor (RM) indicator that determines if the data retrieved and operated upon by the thread executing at the first microprocessor is written to by another thread executing at another microprocessor;

(ii) a write monitor (WM) indicator that determines if the data retrieved and operated upon by the thread executing at the first microprocessor is read by or written to by another thread executing at another microprocessor; and (iii) a buffer (BUF) indicator that indicates whether the data retrieved from the level one data cache and operated upon by the thread executing at the first microprocessor is taken out of cache coherence;

at a transactional status (TS) register of a thread executing at the first microprocessor, accumulating events based on the status of the RM, WM and BUF indicators stored in said second portion of the tag column so that loss of RM, loss of WM and/or loss of BUF will be indicated in the transactional status register if such occurs; and at a transactional condition (TC) register of the thread executing at the first microprocessor, accumulating events that define abort actions that are to occur in the event of the loss of RM, WM and/or BUF status for the data retrieved and operated upon by said thread executing at the first microprocessor, where any abort action will implement a hardware control transfer to a software abort handler; and determining, isolated by the isolation hardware, that the level one data cache is out of resources and as a result, automatically selecting at least a portion of the data from the level one data cache and committing the selected portion of data to main system memory, thus freeing up the level one data cache without dooming or aborting memory isolation mode of the thread running at the first microprocessor, the portion of selected data committed to main memory no longer being isolated with respect to new reads and writes until such isolation is re-established.

15. The computer program product of claim 14, wherein triggering the isolation hardware at the first microprocessor comprises setting an indicator indicating that the first microprocessor is in a hardware transaction.

16. The computer program product of claim 14, wherein the method further comprises detecting an access of the data at the level one data cache of the first microprocessor after the isolation hardware at the first microprocessor has been triggered, by a non-lock respecting microprocessor, by detecting a violation of at least one of local hardware buffering of memory writes or monitoring conflicting read or writes to the level one data cache of the first microprocessor as indicated by loss of at least one of the RM, WN or BUF indicators.

17. The computer program product of claim 16, wherein the method further comprises, as a result of detecting an access of the data in the level one data cache of the first microprocessor by a non-lock respecting microprocessor the software abort handler sends a software notification of a race condition.

18. The computer program product of claim 17, wherein the software notification comprises raising an exception.

19. The computer program product of claim 17, wherein the software notification comprises branching to a specific memory address.

20. The computer program product of claim 17, wherein the software notification comprises setting a status bit.

21. The computer program product of claim 14, wherein the method further comprises:
   executing at the first microprocessor one or more software instructions to release the software lock; and
   as a result of executing one or more software instructions to release the software lock, causing all buffered memory writes in the level one data cache of the first microprocessor to become globally visible and all read monitoring in the level one data cache of the first microprocessor to be dismissed.

22. The computer program product of claim 14 wherein the RM, WM and BUF indicators are each stored in separate columns within said second portion of the tag column.

23. The computer program product of claim 14 wherein the RM, WM and BUF indicators are combined into a single indicator represented in a binary form and stored in a single column of the second portion.

24. The computer program product of claim 14 wherein the level one data cache further comprises an indicator (MESI) that indicates one of the following states for data cached at the first microprocessor: (i) modified, meaning that the data was modified by another microprocessor and no other microprocessors have a cached copy of the data, (ii) exclusive, meaning that no other microprocessor has a cached copy of the data, (iii) shared, meaning that other microprocessors may share the same version of the data, and (iv) invalid, meaning that the data is invalid and will not be used.

25. The computer program product of claim 24 wherein the MESI indicator is stored in a separate column within said first portion of the tag column.

26. The computer program product of claim 24 wherein the RM, WM, BUF and MESI indicators are combined into a single indicator represented in a binary form and stored in a single column of the second portion.

27. In a computing system having a plurality of microprocessors each with the ability to access shared data from a system memory, a microprocessor transactional memory system that enables local buffering of write transactions at a first microprocessor while also monitoring conflicting write transactions at other microprocessors, in order to detect race conditions when threads processing on the first and one or more other microprocessors attempt to write conflicting states for shared data from system memory, the microprocessor transactional memory system comprising:
   isolation hardware at each microprocessor, the isolation hardware at a first microprocessor being triggered by software running at the first microprocessor that acquires a software lock so that thereafter memory writes are buffered internal to the microprocessor, and memory reads are monitored to detect if another microprocessor reads or writes to the memory location being monitored;
   a level one data cache for each microprocessor, the level one data cache comprising;
   a data column for caching data retrieved and operated upon by a thread executing at the first microprocessor; and
   a tag column which has a first portion for storing a physical address for the data retrieved and operated upon by the thread executing at the first microprocessor, and a second portion for storing at least the following indicators relating to the data retrieved and operated upon by the thread executing at the first microprocessor:
   (i) a read monitor (RM) indicator that determines if the data retrieved and operated upon by the thread executing at the first microprocessor is written to by another thread executing at another microprocessor;
   (ii) a write monitor (WM) indicator that determines if the data retrieved and operated upon by the thread executing at the first microprocessor is read by or written to by another thread executing at another microprocessor; and
   (iii) a buffer (BUF) indicator that indicates whether the data retrieved from the level one data cache and operated upon by the thread executing at the first microprocessor is taken out of cache coherence;
   a transactional status (TS) register for each thread executing on a microprocessor, the transactional status register accumulating events based on the status of the RM, WM and BUF indicators stored in said second portion of the tag column so that loss of RM, loss of WM and/or loss of BUF will be indicated in the transactional status register if such occurs; and
   a transactional condition (TC) register for each thread executing on a microprocessor, the transactional condition register accumulating events that define abort actions that are to occur in the event of the loss of RM, WM and/or BUF status for the data retrieved and operated upon by said thread executing at the first microprocessor, where any abort action will implement a hardware control transfer to a software abort handler; and
   determining, isolated by the isolation hardware, that the level one data cache is out of resources and as a result, automatically selecting at least a portion of the data from the level one data cache and committing the selected portion of data to main system memory, thus freeing up the level one data cache without dooming or aborting memory isolation mode of the thread running at the first microprocessor, the portion of selected data committed to main memory no longer being isolated with respect to new reads and writes until such isolation is re-established.

28. The system of claim 27, wherein the software abort handler sends a software notification of a race condition that comprises at least one of raising an exception, branching to a specific memory address, or setting a status bit.

29. The microprocessor transactional memory system of claim 27 wherein the RM, WM and BUF indicators are each stored in separate columns within said second portion of the tag column.

30. The microprocessor transactional memory system of claim 27 wherein the RM, WM and BUF indicators are combined into a single indicator represented in a binary form and stored in a single column of the second portion.

31. The microprocessor transactional memory system of claim 27 wherein the level one data cache further comprises an indicator (MESI) that indicates one of the following states for data cached at the first microprocessor: (i) modified, meaning that the data was modified by another microprocessor and no other microprocessors have a cached copy of the data, (ii) exclusive, meaning that no other microprocessor has a cached copy of the data, (iii) shared, meaning that other microprocessors may share the same version of the data, and (iv) invalid, meaning that the data is invalid and will not be used.

32. The microprocessor transactional memory system of claim 31 wherein the MESI indicator is stored in a separate column within said first portion of the tag column.

33. The microprocessor transactional memory system of claim 31 wherein the RM, WM, BUF and MESI indicators are combined into a single indicator represented in a binary form and stored in a single column of the second portion.

* * * * *